(12) United States Patent
Sivathanu et al.

(10) Patent No.: US 11,405,181 B2
(45) Date of Patent: Aug. 2, 2022

(54) LIGHTWEIGHT BLOCKCHAIN BASED ON SPLIT-TRUST

(71) Applicant: Microsoft Technology Licensing, LLC, Redmond, WA (US)

(72) Inventors: Muthian Sivathanu, Bengaluru (IN); Nishanth Chandran, Bangalore (IN); Divya Gupta, Bangalore (IN); Apurv Mehra, Bengaluru (IN); Satyanarayana V. Lokam, Bangalore (IN); Sambhav Satija, Bengaluru (IN); Sudheesh Singanamalla, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 432 days.

(21) Appl. No.: 16/510,144

(22) Filed: Jul. 12, 2019

(65) Prior Publication Data
US 2021/0014042 A1   Jan. 14, 2021

(51) Int. Cl.
*H04L 29/06* (2006.01)
*H04L 9/06* (2006.01)
*G06F 16/901* (2019.01)

(52) U.S. Cl.
CPC ........ *H04L 9/0637* (2013.01); *G06F 16/9027* (2019.01); *H04L 9/0643* (2013.01); *H04L 9/0656* (2013.01); *H04L 2209/38* (2013.01)

(58) Field of Classification Search
CPC .. G06F 16/9027; G06F 21/62; G06F 21/6209; G06F 21/6218; G06F 21/6227; G06F 16/1824; G06F 21/44; G06F 21/629; G06F 16/2379; H04L 9/0656; H04L 9/0643; H04L 9/30; H04L 2209/38; H04L 9/0637; H04L 9/0618; H04L 9/3247; H04L 9/3239; H04L 9/3263; H04L 2209/56; G06Q 20/06; G06Q 20/382; G06Q 20/401; G06Q 2220/00; G06Q 20/381;
(Continued)

(56) References Cited

U.S. PATENT DOCUMENTS

| | | | | |
|---|---|---|---|---|
| 2017/0344987 | A1* | 11/2017 | Davis | G06F 16/2255 |
| 2020/0160330 | A1* | 5/2020 | Yan | G06Q 20/405 |
| 2020/0296111 | A1* | 9/2020 | Karame | H04L 9/3239 |

FOREIGN PATENT DOCUMENTS

| | | |
|---|---|---|
| CN | 108694669 A | 10/2018 |
| CN | 108712468 A | 10/2018 |

OTHER PUBLICATIONS

"International Search Report and Written Opinion Issued in PCT Application No. PCT/US20/034431", dated Jul. 27, 2020, 10 Pages.

* cited by examiner

*Primary Examiner* — Malcolm Cribbs
(74) *Attorney, Agent, or Firm* — Schwegman Lundberg & Woessner, P.A.

(57) ABSTRACT

A system includes a set of low resource devices, each configured to receive transactions to be added to an encrypted block chain ledger from a sample of untrusted high resource devices, prepare a proposed block of the received transactions, provide the proposed block to the sample of untrusted high resource devices, receive proposed blocks from the untrusted high resource devices originating from the set of low resource devices. The low resource devices run a consensus protocol to select one proposed block to add to the encrypted block chain ledger stored on the untrusted high resource devices.

20 Claims, 8 Drawing Sheets

(58) Field of Classification Search
CPC .............. G06Q 40/04; G06Q 20/3825; G06Q 20/3827; G06K 9/00577; G06K 2009/00583
See application file for complete search history.

LIGHTWEIGHT BLOCKCHAIN BASED ON SPLIT-TRUST

BACKGROUND

A blockchain is a distributed ledger of transactions. The traditional model of ledger maintenance is that a centralized authority such as a bank maintains the ledger of transactions, and the parties transacting with the bank (i.e., the account holders) trust the bank to not manipulate or tamper with the records. The authority tracks a global state, which reflects the present state of the world (e.g., the account balances of each of its users). In addition to managing the ledger and the global state, the bank also validates transactions; only legitimate transactions make it to the ledger (e.g., a user cannot transfer more than their bank balance).

A blockchain provides all the above properties, but without a centralized authority (such as a bank) that everyone trusts. A group of mutually untrusted parties that participate in a blockchain can collectively validate transactions and maintain a consistent ledger and global state. As long as more than a threshold of the participants (typically two-thirds) are honest, a blockchain guarantees that all the honest parties will agree on the exact ordering of transactions in the ledger and the contents of the global state. This guarantee holds even if the remaining one-third participants are arbitrarily malicious and collude to subvert the blockchain guarantees.

More formally, a blockchain must provide safety, liveness, and fairness. Safety ensures that the above guarantees of consistency of blocks among honest participants and validity of transactions are preserved as long as the number of honest participants is above a specified threshold (e.g., two-thirds). Liveness ensures that malicious participants cannot indefinitely stall the blockchain by preventing new blocks to be added. Fairness ensures that all valid transactions submitted to the blockchain get committed in a reasonable amount of time, and malicious participants cannot indefinitely starve specific transactions.

Significant computing resources are consumed by members to perform operations related to blockchains. Members validate, submit, and add transactions to the blockchain. The amount of computer resources used by members limits the number of members that can participate to only those who have sufficient resources. Applications of blockchain are thus practically limited to applications that have users/members that can support the use of significant computing resources.

SUMMARY

A split trust blockchain system splits tasks between members that may utilize low resource devices, also referred to as resource constrained computing devices, and untrusted high resource devices. The untrusted high resource devices need not be trusted devices but have the computing resources available to perform most of the computing resource intensive operations in storing a blockchain ledger and global state. The untrusted high resource devices are used by the low resource devices to perform gossip. The low resource devices run a consensus protocol to select blocks proposed by the members.

DETAILED DESCRIPTION

Figure 1:
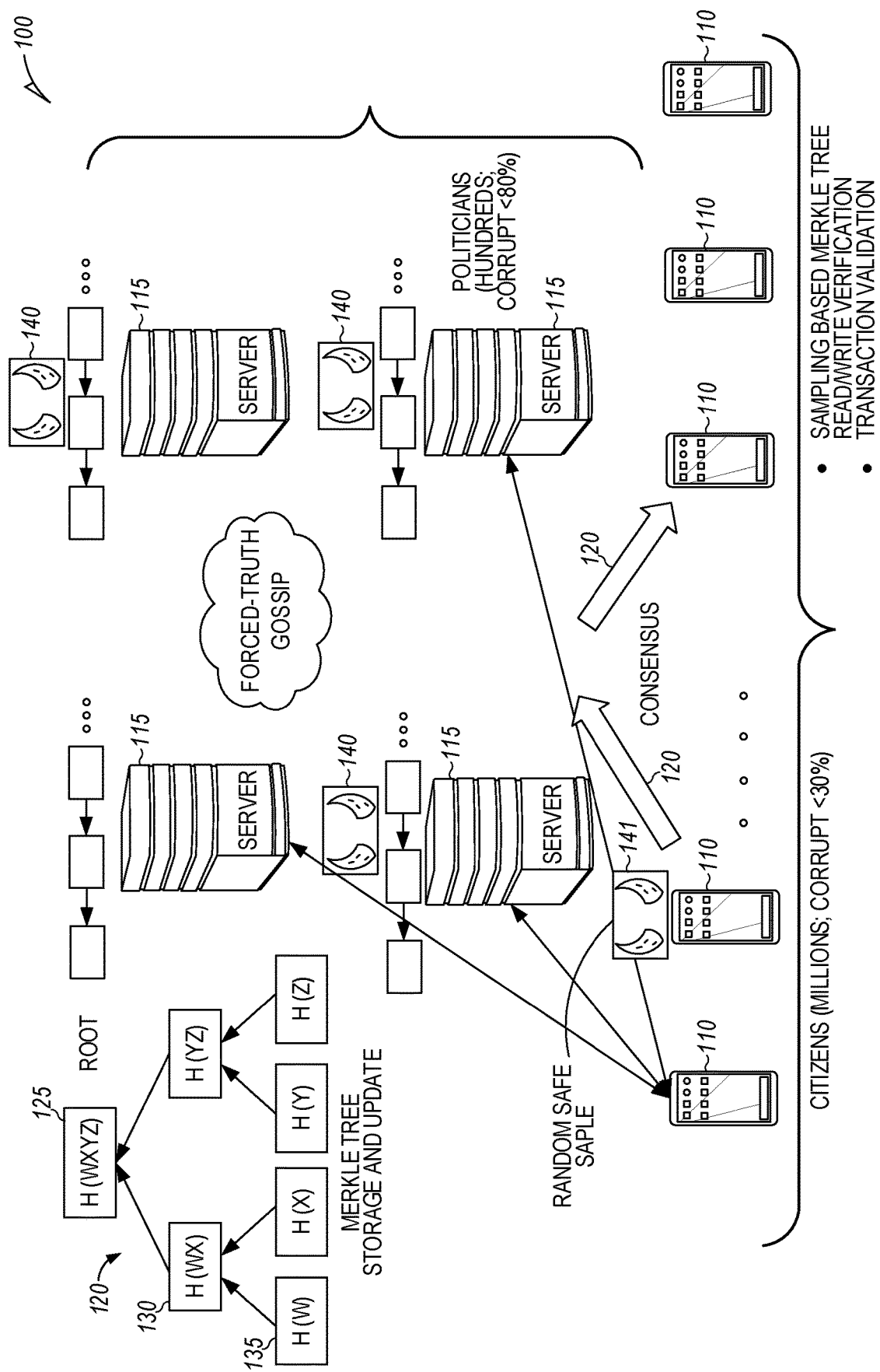
FIG. 1 is a block diagram of a split trust blockchain system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Blockchains provide a powerful systems abstraction: they allow a set of mutually untrusted entities (members) to collectively manage a ledger of transactions in a decentralized manner. Despite the lack of a centralized "source of truth", and a subset of members being malicious, blockchains guarantee with a high degree of certainty that (a) all honest participants agree on the same state of the ledger and the database, and (b) only legitimate transactions get into the ledger. While a popular use of blockchains today is in cryptocurrencies, the blockchain abstraction has transformative potential in improving regular business processes as well.

Blockchains require that a majority (typically two-thirds) of participating members are honest. To ensure this, either participating members are structured to have a shared business interest in the success of the blockchain (e.g., consortium blockchains), or the blockchain handles large number of participants (e.g., public blockchains such as Bitcoin), making large-scale collusion hard.

Unfortunately, both the above models are fraught with limitations. Careful structuring of a separate consortium for each isolated use-case limits inter-operability, while large-scale adoption of public blockchains requires incentivizing the participating members to invest significant computing resources. The significant computing resource investment is a reason why public blockchains mostly target cryptocurrency rather than business applications.

Split trust blockchain enables massive scale of participation—the blockchain can handle hundreds of millions of members who participate in consensus and validation of transactions. In order to enable wide-scale user adoption, split trust blockchain is extremely lightweight on resource usage at member nodes. Members may use a smartphone with minimal data and battery usage, in contrast to traditional blockchains where members run powerful servers with heavy storage, communication, and compute resources. Despite large scale of participation and resource-starved member nodes, split trust blockchain provides high throughput of transactions, thus scaling to real-world business operations. Split trust blockchain achieves these properties with a novel split-trust design based on delegated storage and gossip through untrusted nodes.

Running a blockchain on a smartphone brings up fundamental system challenges, as resource usage at the member nodes needs to be reduced by orders of magnitude along several dimensions: storage, communication, and computing. Smartphones are currently resource constrained computing devices. Blockchains rely on peer-to-peer gossip between members to push new blocks. At a high transaction rate, peer-to-peer gossip would require tens of GBs of data transfer per day, which is infeasible through a cellular data connection. The present subject matter, split trust blockchain, utilizes a much smaller amount of data transfer by smartphone using members, such as only about 50 MB of data transfer per day by a smartphone.

In terms of storage, member nodes traditionally keep a copy of the entire blockchain, which could run to several terabytes in high-throughput scenarios. Split trust blockchain members incur only a few MBs of storage cost. High computing loads on mobile nodes such as smartphones (for example, even gossip can be taxing, and proof-of-work-like computations can be extremely taxing) can drain batteries. Split trust blockchain ensures that battery drain is manageable. By splitting trust related functions between resource constrained devices of members and untrusted high resource devices that perform resource intensive functions, split trust blockchain ensures that a member user incurs no perceptible cost.

To achieve the above, split trust blockchain adopts a system design based on a split-trust model. There are two types of nodes in split trust blockchain: Citizens and Politicians. Citizens run on low resource, or resource constrained devices such as smartphones and have voting power, while Politicians run on powerful servers, high resource devices, and do the heavy work, but are untrusted, i.e., do not participate in consensus. Two-thirds of the Citizens are expected to be honest (a reasonable assumption with millions of Citizens), but because Politicians are untrusted (a few hundred in number), only at least 20% of the Politicians are required to be honest for proper functioning of the split trust blockchain.

Although Politicians do the heavy work, the Citizens can detect and handle malicious behavior even if 80% of the Politicians are malicious and collude along with the one-third of malicious Citizens. A key primitive that enables Citizens to deal with high dishonesty rate of Politicians is replicated verifiable reads, where the Citizen reads the same data from multiple Politicians and can determine the correct value even if only one (out of say 15) speaks the truth.

Citizens perform validation of transactions, decide on the block to commit, and the resultant global database state by running Byzantine consensus among them. To make such consensus feasible, split trust blockchain builds on a known system where a random sub-committee of a few thousand Citizens gets cryptographically chosen for each block, and consensus runs only among the members in the sub-committee. A sub-committee selection algorithm is modified to make it battery-friendly for the resource constrained computing devices of Citizen members. The previous known selection algorithm requires each Citizen phone to wake up every round to check if it's chosen; in split trust blockchain, a Citizen securely knows in advance when it will serve on the committee next and thus may choose to wake up to serve, but otherwise sleep and conserve battery power unless being used for other functions or apps.

To save communication cost, Citizens do not gossip directly, but through Politicians; data written by a Citizen gets gossiped among Politicians, and interested Citizens read the data from Politicians. Performing gossip reliably and efficiently when 80% of the Politicians are malicious, is a key challenge. Split trust blockchain uses a novel technique of forced-truth to keep gossip cost very low.

In order to keep storage cost at the Citizens low, Politicians store the blockchain and the global database, relieving Citizens of the need to store large amounts of data. Citizens read a small subset of data from Politicians and write out the newly committed block. The small subset of data read by Citizens includes the key-value pairs that are referenced in the transactions for the current block.

Because the network bandwidth at Citizens is low (~1 MB/s), the amount of data read and written by the Citizens per block, limits transaction throughput. Further, because the Politicians are untrusted, Citizens cannot rely on the correct latest values returned by them for, say, a given key. Split trust blockchain uses a novel technique of sampling-based Merkle tree read/write that reduces communication cost significantly while ensuring tolerance to malicious Politicians.

To reduce the damage that 80% malicious Politicians can cause to performance, split trust blockchain employs several techniques to restrict their ability to lie. A technique called pre-declared commitments is used to significantly constrain the range of malicious behavior that can go undetected. Second, provable lies (e.g., returning two contradictory answers for the same question) results in blacklisting them in an efficient way from subsequent rounds. These techniques significantly reduce the Citizen's resource utilization, which enables split trust blockchain to achieve a high transaction throughput despite running on resource-starved smartphones.

Split trust blockchain provides a high throughput of transactions per second and can run with very low resource usage (negligible battery usage and data usage) on smartphones, demonstrating the feasibility of this approach, and pointing to a new paradigm for building trustworthy, decentralized applications.

In one embodiment the Citizen node may be implemented as an Android device or other application, and Politician nodes may be implemented as a server running in the cloud. The split trust blockchain system runs on low-resource devices like smartphones, supporting high scale of members and high throughput, and theoretically provide safety, liveness, and fairness. The split-trust system is based on Citizens and Politicians to enable very low-cost consensus on smartphones, while offloading heavy work to untrusted nodes in a verifiable way. Several optimizations may be used to achieve good performance despite the high fraction of malicious Politicians without compromising safety or liveness.

Split trust blockchain is a large scale blockchain service for tracking business transactions, that achieves collusion-resistance by enabling millions of participating members. By removing the need for a consortium to be carefully structured for every individual use-case, such a blockchain service can be used to track a variety of transactions across inter-operating workflows, including those involving public funds such as donations to philanthropies or government spending.

Split trust blockchain members may participate with a smartphone, thus lowering the cost of participation by orders of magnitude. A low cost of participation facilitates wide-scale adoption of a blockchain service by millions of members especially in non-cryptocurrency scenarios. Despite being extremely lightweight, split trust blockchain supports a high transaction throughput to scale to real business needs, thus simultaneously achieving three conflicting properties: large scale of participation, high throughput, and lightweight resource usage.

Some fundamentals of blockchain are first described, followed by details describing how functions associated with such fundamentals are implemented in the split trust blockchain system. A blockchain is a replicated, peer-to-peer distributed system built on the following basic primitives:

Signed transactions: The basic unit of work in a blockchain is a transaction. A transaction effectively reads and updates on a few elements in a global state. For example, a transaction that transfers $1000 from Alice to Bob, would debit the balance of Alice and credit the balance of Bob in the global state. For a transaction to be valid, (a) the transaction must be appropriately signed by the entity submitting the transaction, (b) the user signing the transaction must have write access to the appropriate key-values touched in the transaction (e.g., the balance that is debited) (c) other business-level checks on integrity must pass, e.g., the balance of Alice should be higher than $1000 in the above example.

Cryptographic linkage: A blockchain is a list of blocks. A block is simply a list of transactions. The number of transactions in a block is calibrated for efficiency to amortize fixed cost in committing a block. At a high level, a block can be viewed akin to a page in a manual ledger book that banks used to track. While the contiguity of pages in a ledger book is ensured by the page numbering (which is tamper-resistant), the contiguity of blocks in a blockchain is ensured by a cryptographic linkage; every block embeds the cryptographic hash of the contents of the previous block. Thus, if block N is committed, it also automatically certifies the contents of blocks 0 to N-1, through transitive linkage.

Merkle tree for Global State: A key part of a blockchain is the global state database that tracks keys and their current values. This global state has to be managed in a tamper-resistant manner. Tamper resistance can be ensured by publishing a cryptographic hash of the entire contents of the global state, such that any tampering of the state would invalidate the published content-hash. However, with naive hashing, when a single key changes in the global state, it would require recomputing the hash on the entire contents, making updates prohibitively expensive. To address this, blockchains typically use a Merkle tree, which makes the update and verification cost logarithmic in the number of key-value pairs. The Merkle tree is built with leaf nodes that contain the actual key-values, while each intermediate node contains a hash of the concatenated contents of its child nodes. The root of the tree is a single hash value that represents the entire state. A mutation of a single key only requires recomputation of hashes along the path (of logarithmic length, as opposed to linear length in the trivial solution) from that leaf to the root—the rest of the tree remains unchanged.

Multi-writer replication: A blockchain is essentially a replicated state machine, that operates under byzantine failures where some subset of participants can be malicious. More specifically, a blockchain follows the multi-writer model of replication, where any participant can independently update the ledger, by a proposal to add a new block to the ledger. A consensus protocol determines which participant wins, and the block of the winner is committed to the blockchain. Each participant in the blockchain keeps a copy of the entire ledger and the latest copy of the entire global state, with the guarantee that all honest parties have the same state of committed blocks.

Gossip: As part of state machine replication, participants in a blockchain exchange state with each other in a peer-to-peer fashion. For example, when a transaction is submitted to a participant, it must be sent to other participants. Similarly, when a new block gets proposed or gets committed to the ledger, the block has to be communicated to all other participants. This communication happens through gossip. Each participant sends the message to a certain number of neighbors who in turn send to more participants, achieving eventual consistency on the exact ledger state.

Consensus Protocol: The key primitive powering blockchains is distributed consensus. While standard consensus protocols are widely used in several distributed systems, the consensus mechanism in blockchains needs to handle a Byzantine failure model, because a few participants are assumed to be malicious and actively working to subvert or corrupt the blockchain. As a result, they use a byzantine consensus protocol, or a novel consensus mechanism called Nakamoto consensus used in Bitcoin. At a high level, a byzantine consensus mechanism provides the guarantee that when multiple participants propose their own blocks, all honest participants agree on one winning block, in the presence of adversarial attacks by the malicious participants. Most byzantine consensus mechanisms require at least ⅔rd of the participants to be honest, and they require several rounds of communication between the participants.

Cryptocurrencies: Cryptocurrencies is perhaps the most popular application of blockchains today, pioneered by the Bit-Coin system. A cryptocurrency is a decentralized currency system managed among participants, where each participant can mine new coins by spending compute power. Cryptocurrencies are typically managed by public blockchains such as Bitcoin or Ethereum, that allow any arbitrary user to become a participant in the blockchain consensus; all the user needs to have is compute power.

Business use-cases: Blockchains have great potential to improve efficiency of mainstream business processes, such as making inter-bank transfers efficient, providing end-to-end tracking in the logistics ecosystem, etc. Such blockchains are typically managed by a small consortium of parties (e.g., in inter-bank transfers, each participating bank will have a member node in the blockchain) and are hence referred to as consortium blockchains or permissioned blockchains. Because of the restricted nature of participation, no external entity can be part of the blockchain.

A fundamental assumption in a blockchain is that a majority (or two-thirds) of participants are honest. Public blockchains ensure this property by allowing a large number of participants, so that it is unlikely that more than one-third participants collude. To support large scale of participants without identities, such public blockchains have traditionally employed an expensive consensus mechanism based on proof of work. Consortium blockchains, on the other hand, support only a small number of participants (few tens), but because the members are carefully structured so that they have a shared incentive in the success of the process that is implemented by the blockchain, the honest-majority assumption still holds. In brief, a large scale of participants provides for a more collusion-resistant blockchain.

The number of transactions that are committed to the ledger per second determines the class of applications a blockchain can be used for. Public blockchains such as Bitcoin support a very low transaction throughput (~1 to 4 transactions per second) because of the proof-of-work consensus. Hence public blockchains are mainly used in cryptocurrencies as they cannot handle real-world business throughput. A recently proposed blockchain system is the first instance of a public blockchain that could provide a transaction rate of nearly one-thousand transactions per sec. Consortium blockchains, because of their low scale of participants and more traditional consensus algorithms (such as PBFT), typically provide thousands of transactions per second, making them the platform of choice for real business applications.

A common aspect of all blockchain architectures today, i.e., public and consortium blockchains is that they assume that the participants run powerful servers with high amount of storage, computing resources, and network resources. To illustrate the scale of resources desired, consider a high-throughput blockchain that handles 1000 transactions/sec.

TABLE 1

Comparison of blockchain architectures

| Blockchain | Scale of participants | Throughput | Resource Cost | Incentive needed? |
|---|---|---|---|---|
| Public Blockchains (e.g., Bitcoin, Ethereum) | Millions | 4-10/sec. | Very high (proof of work) | Yes |
| Consortium Blockchains (e.g., HyperLedger) | Tens | 1000 s/sec. | High | Yes |
| Split trust blockchain | Millions |  | Ultra-low | No |

In one example, with roughly 100 bytes per transaction (a low estimate considering signatures), and 1000's of transactions per second, the rate of new blocks generated would be 10 GB/day, which needs to be gossiped in a peer-to-peer fashion. This translates to a network egress of 50 GB/day with a gossip fanout of 5 neighbors. Similarly, such a blockchain would quickly reach the scale of terabytes of data which needs to be stored locally at each participant. The sheer CPU cost to perform gossip and validation would be quite significant. Blockchains based on proof-of-work spend a lot more compute resources just for puzzle-solving. Blockchain architectures therefore expect the participant nodes to be run on powerful servers.

Split trust blockchain, on the other hand allows members to participate using a smartphone with negligible data (<50 MB/day—i.e., 1000× lower compared to above estimate) and low battery use (<5% per day).

As a consequence of the high resource cost incurred by participants, existing blockchain architectures need an incentive mechanism for participants. In cryptocurrency applications powered by public blockchains, the incentive is that participants can "mine" coins. In consortium blockchains, the participating entities have a shared interest in improving the business process involved.

However, such direct dependence on incentives also fundamentally constrains the range of applications of blockchains. As an example, tracking a real-world set of transactions involving transfer of public funds across multiple parties, cannot fit in any of the present blockchain architectures. Forming a consortium to administer such a blockchain is challenging because the members of the consortium could collude thus violating the majority-honest property. This problem can be solved by having a large scale of participants. Unlike cryptocurrency, participants do not have a direct incentive to invest huge resources, so such a blockchain cannot gain adoption. To be applicable to broad use-cases, the cost incurred by the participants/members, have to be so negligible that a large number of participants can altruistically participate without any incentive, just to build a more transparent and accountable world.

Table 1 compares different blockchain architectures along these three dimensions. As can be seen, split trust blockchain is the first blockchain that achieves all three of the above dimensions: high scale, high throughput, and low-cost participation. While prior public blockchains achieve scale and throughput, expensive servers are still used at the participant nodes. Split trust blockchain enables the participating members to use a smartphone. As the cost of participation by members is so low, split trust blockchain can support several real-world use-cases where the participants may not have a direct stake or incentive to participate but are altruistic to run an app in the background that consumes negligible battery and network.

Split trust blockchain enables a high-throughput blockchain with very low resource usage at the participant nodes.

FIG. 1 is a block diagram of a two-tier split trust blockchain system 100 with asymmetric trust. The system 100 is illustrated along with the structure of where algorithms are executed. There are two kinds of nodes in split trust blockchain: Citizens 110 and Politicians 115. Citizens 110 are low resource devices, such as resource-constrained (e.g., run on smartphones), are large in number (several millions), and are the only entities having voting power in the system (i.e., participate in blockchain consensus 120). Politicians 115 are high resources devices such as powerful resource-heavy servers and are a lot fewer in number (low hundreds). Politicians 115 do not have any voting power. Politicians 115 execute decisions taken by Citizens 110 and cannot take any decisions on their own. Effectively, Politicians 115 serve as a vehicle for off-loading computing and storage resources that Citizens 110 use to do their work with low resource cost.

Split trust blockchain system 100 includes a Merkel tree 120 that includes a root node 125, intermediate nodes 130, and leaf nodes 135. As an example, horns 140 are used to indicate devices that may be malicious. A cloud representing forced truth gossip 150 is shown between the Politicians 115, and represents communications referred to as gossip that the Politicians 115 perform for the Citizens 110.

Blockchain consensus 120 relies on at least two-third of the participants, Citizens 110, to be honest. Because only Citizens 110 participate in consensus in split trust blockchain, two-thirds of the Citizens 110 are expected to be honest, while the rest can be malicious and collude among themselves. This expectation is reasonable because of the large number of Citizens 110 that split trust blockchain allows, which makes it unlikely for them to collude or to be corrupted.

However, Politicians 115 enjoy a much lower level of trust, and in fact may generally be characterized as untrusted. Split trust blockchain is designed to tolerate a much higher level of corruption among Politicians 115, such that a majority of corrupt or malicious Politicians 115 is acceptable. In particular, 20% of the Politicians 115 are required to be honest in one embodiment; the remaining 80% Politicians 115 can be malicious and collude among themselves. Further, the 80% malicious Politicians 115 can collude with the one-third malicious Citizens 110 as they are assumed to be under the worst-case scenario of being controlled by a single adversary.

It is assumed that an adaptive adversary that can corrupt any subset of nodes in the system and that it would take at least a threshold amount of time (equal to the latency of committing a single block) to dynamically corrupt a node. The threshold amount of time for corruption is a parameter in split trust blockchain system 100. At a default block size of 2 MB, this translates to a threshold of about 30 seconds, which is a reasonable threshold for dynamic corruption. Also, unlike prior public blockchains, it is assumed that the corruption is not dynamic—i.e., nodes once corrupted contribute to the corruption threshold of the adversary and cannot then be "uncorrupted". This (reasonable) assumption allows a design of a verifiable random function (VRF) in a way that is much more battery-friendly.

Figure 2:
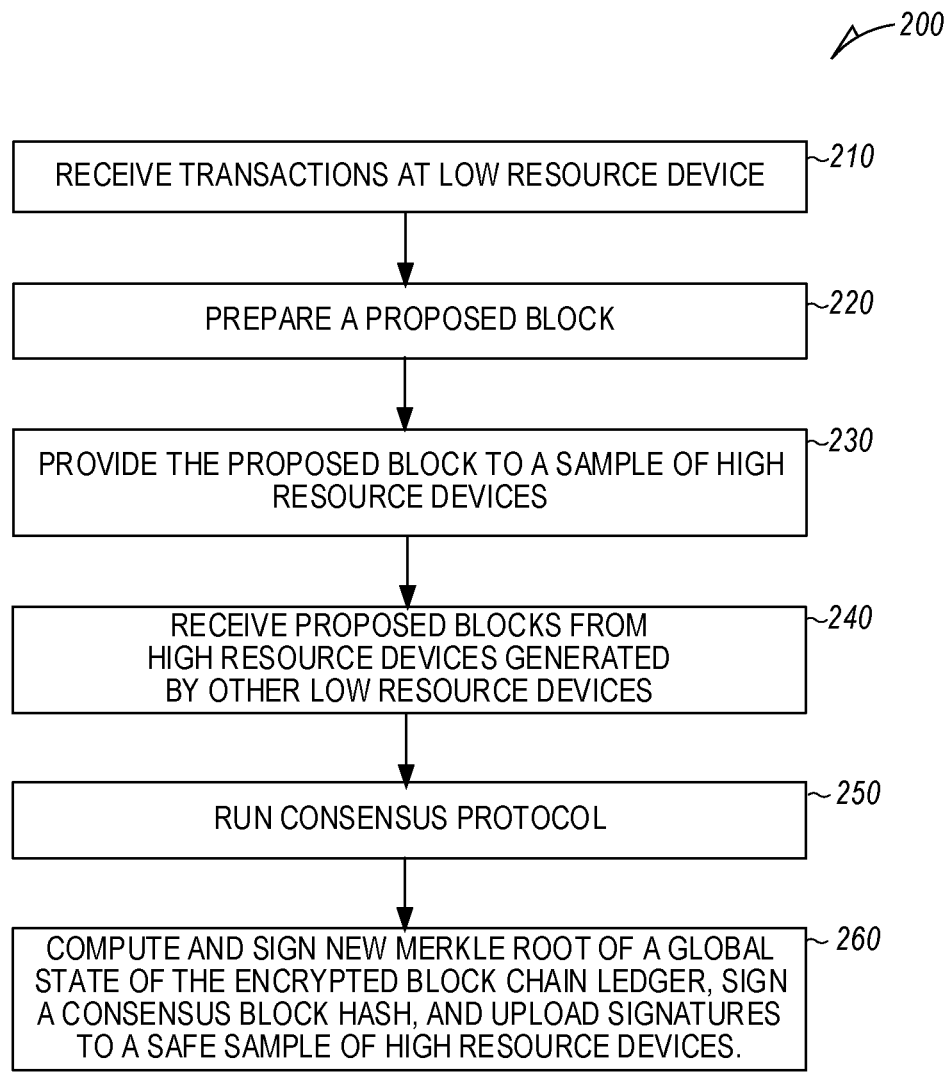
FIG. 2 is a flowchart illustrating a method implemented by a first resource constrained computing device (Citizen) according to an example embodiment.

FIG. 2 is a flowchart illustrating a method 200 implemented by a first resource constrained computing device, also referred to as a Citizen. The Citizen may be a mobile device such as a cellular phone in one embodiment. The Citizen is configured to perform operations for selecting blocks to add to a split trust blockchain. Transactions to be added to an encrypted block chain ledger are received at operation 210 from a sample of high resource devices, also referred to as Politicians. The Citizen then prepares a proposed block of the received transactions at operation 220 and provides the proposed block of transactions at operation 230 to the sample of untrusted high resource devices. The Citizen will validate the transactions as part of operation 220 before adding transactions to the proposed block. At operation 240, the Citizen receives proposed blocks from the untrusted high resource devices originating from a set of resource constrained computing devices referred to as other Citizens. The Citizen then runs its portion of a consensus protocol at operation 250 to select one proposed block to add to the encrypted block chain ledger stored on the untrusted high resource devices.

The Citizen is aware of times the device needs to be awake to run the consensus protocol. The awareness may come from the Citizen calculating the time it needs to be awake based on a known random number generator seed and then waking at or before that time. In one embodiment, the Citizen computes a new Merkle root of a global state of the encrypted block chain ledger, signs the new Merkle root, signs a consensus block hash, and uploads signatures to a safe sample of high resource devices.

Split trust blockchain system 100 is designed to handle many different types of attacks.

Sybil attacks: To handle Sybil attacks (forging identities in a peer to peer network), split trust blockchain ensures that spurious participants do not get a disproportionate share of voting. There are two ways of handling Sybil like attacks. Some blockchains handle disproportionate voting by weighting voting power by the amount of stake a participant has in the system. Split trust blockchain system 100 may use a similar mechanism when used in that setting. In one embodiment, Citizen node identities are backed by an external identity manager that handles de-duplication (e.g., Aadhaar biometric-based identity that has a reach of 1.1 billion citizens in India.).

Although 80% of the Politicians can be malicious, the range of possible attacks they can employ is limited due to the design of the system. Importantly, Politicians cannot fabricate messages because the only messages trusted in the system are messages that are signed by a quorum of Citizens. The following are some broad classes of attacks a malicious Politician can employ:

Staleness Attack: When a Citizen node asks the Politician for some state (e.g., the latest committed block), the Politician could return a stale block. Such a response would be valid because the old block would also have been signed by a quorum of Citizens.

Split-View Attack: A Politician can also respond selectively to some Citizens and not respond to others, causing a split in the world-view seen among honest Citizens. Worse, a Politician can respond with two different values to different subset of Citizens. Such split view can also happen in a coordinated manner where the malicious Politicians only gossip among themselves, such that no honest Politician has a certain data item. The Politician can then choose to selectively relay this information only to some Citizens. This has a bearing on consensus described in greater detail below.

Drop Attack: On a write made by a Citizen, a malicious Politician may drop the data without committing it or gossiping it to other Politicians. Similarly, on a read, the Politician can remain silent and not respond to a read request even though the Politician has the data.

Detectable v. Covert maliciousness: Malicious behavior by Politicians falls under two kinds: detectable and covert. Detectable maliciousness is easier to handle by blacklisting, based on a succinct proof of lying. For example, if a Politician can only send one group of transactions in a round, but there are two version signed by the same Politician for the same round, that is detectable. Covert maliciousness occurs when the Politician selectively responds to some Citizens but not others, or silently drops messages, etc., and is what many of the new split trust blockchain techniques are designed to handle.

Citizens and Politicians collaborate to perform the various traditional tasks associated with maintaining and updating a blockchain.

Storage: While in a traditional blockchain, every participant keeps a replica of the entire blockchain locally, Citizens in split trust blockchain cannot afford to store terabytes or more of data. Therefore, in split trust blockchain, Politicians store a copy of the blockchain ledger and the global state (i.e., database of key-value pairs). Citizens read subsets of this data from Politicians as needed.

Transaction Validation: As Citizens are the actual participants in consensus, they validate the legitimacy of transactions. For example, they ensure that the transactions are appropriately signed, and whether the transaction results in violation of business logic (such as over-spending). To perform validation, Citizens read the pending transactions from Politicians, then lookup latest copies of the data referenced in the transactions from the global state maintained by the Politicians. Citizens then perform local validation of the transactions, and propose a block containing valid transactions.

Gossip: To achieve consensus among participants on the block to be committed/appended to the chain, gossip between the participants is used. However, direct gossip among Citizens would incur prohibitive cost. Split trust blockchain allows Citizens to gossip through Politicians. In particular, if a Citizen needs to broadcast information to other Citizens, the Citizen sends a message to a random safe sample of Politicians so that the message reaches at least one honest Politician. The random safe sample in some embodiments is approximately 15 Politicians. More may be used in some embodiments to be even safer, or fewer may be used if less safety is required for any particular application. Politicians then gossip data among themselves, as they can afford to do so because they are powerful servers with plentiful network connectivity. Other Citizens can then read from the Politicians, once again, reading from multiple Politicians, such as the same or a different random set of Politicians, if desired. Thus, the same semantics of peer-to-peer gossip among Citizens is achieved, but without them incurring heavy network costs.

Consensus: Citizens participate in consensus by performing gossip through Politicians. However, given the large scale of Citizens in split trust blockchain, all citizens cannot participate in every block. Instead, a random committee of citizens (roughly 2000 in size) is selected for each block. The sub-committee for a block changes every block, by using a verifiable random function (VRF). The selection mechanism has the property that a Citizen will be able to cryptographically prove to others that it is chosen for the specific block, but other Citizens or Politicians cannot know in advance the set of committee members for, say, the next block. Once a threshold number of committee members for the present block have signed the block, that block becomes committed.

One mechanism that Citizens in split trust blockchain use to get useful work out of Politicians despite their 80% corruption, is replicated reads and writes. If a Citizen needs to write, say, a new block to Politicians, the Citizen needs to ensure with high probability that the Citizen is communicating with an honest Politician; if the Politician was corrupt, the corrupt Politician could simply drop the data. To circumvent this, most reads and writes by Citizens happen with a random safe sample of Politicians. The size of the sample may be fixed such that with high probability, at least one Politician in the sample is honest. For example, with a sample size of 15, the probability of hitting at least one honest Politician is $1-(0.8)^{15}=96\%$. With a sample size of 30, this probability increases to 99.8%, but the overhead doubles. The mechanism is resilient to a small number of Citizens (say 4%) getting unlucky to pick all dishonest Politicians; those Citizens will be treated as "malicious", thus cutting into the budget of one-third malicious Citizens.

Note that it is sufficient for the Citizen to talk to just one honest Politician, because a message that reaches an honest Politician is guaranteed to be gossiped to all other honest Politicians. Providing such a guarantee when 80% of the Politicians are malicious, is tricky.

In split trust blockchain, only Politicians store the Merkle tree of the entire global state; keeping a large global state up to date in Citizens is not feasible given expected resource constraints associated with Citizens. Therefore, to validate a transaction, a Citizen looks up the latest and correct value of the keys referenced in the transaction. During commit, the Citizen updates the Merkle tree with the new values resulting from the transaction and signs the new Merkle root 125. The challenge lies in doing so in a world of untrusted Politicians.

The Merkle root 125 is signed by a quorum of Citizens who were in the committee of the previous block, so the Politician cannot lie about the Merkle root 125. The root 125 is signed along with the corresponding round (block) number, and since Citizens contact multiple Politicians to get the latest signed Merkle root, Citizens can have a guarantee on the latest correct root. Now, a Citizen needs to verify that the value returned for a given key indeed corresponds to the signed Merkle root. To enable such verification, the Politician is required to send a challenge path for each key leading up to the Merkle root. Intuitively, the challenge path enables a Citizen to locally compute the entire path from the value of the leaf to the signed Merkle root. The computation consists of the hashes of sibling nodes of the Merkle tree at each level upwards from the leaf 135. In a tree with 1 billion key-value pairs, this challenge path would comprise of 30 hashes.

Update of keys in the Merkle tree also follows a similar protocol. The Citizen gets challenge paths for the entire set of keys to be updated. The Citizen can then build a partial Merkle tree with the new leaf 135 values and compute the new Merkle root. As the Politician cannot present spurious challenge paths (manufacturing new intermediate values to result in a root hash that is the same as the signed Merkle root hash would require finding a collision in the hash function, which is computationally infeasible), both reads and updates work despite dishonesty of Politicians.

Figure 3:
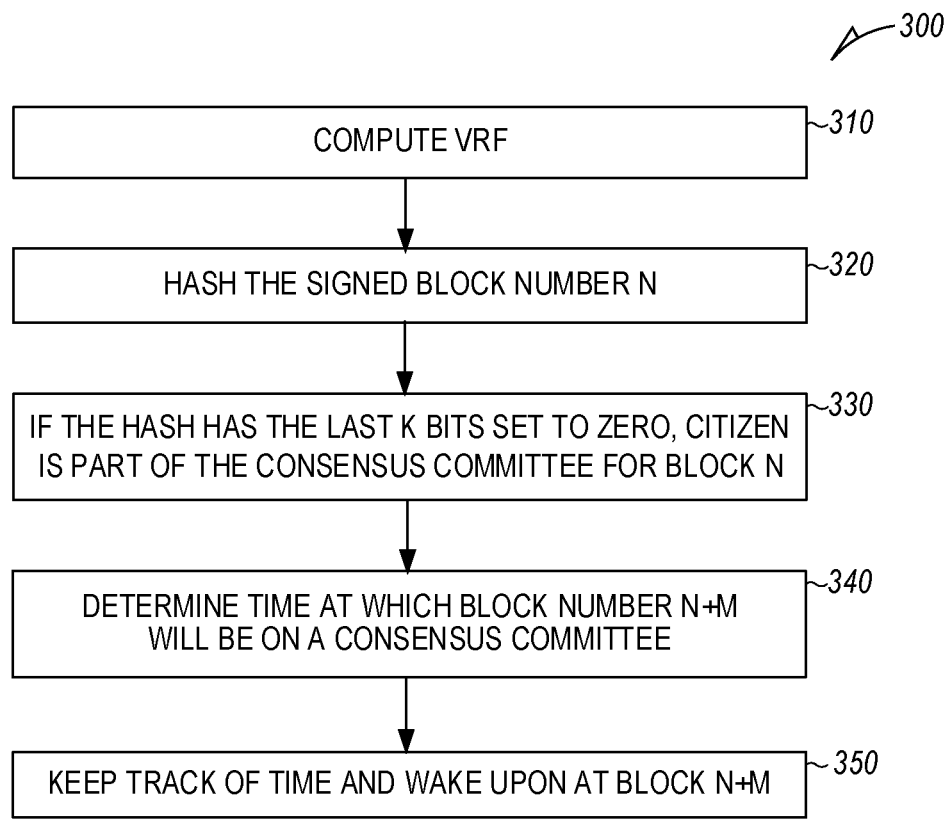
FIG. 3 is a flowchart illustrating a computer implemented method of determining blocks for which an individual Citizen is a committee member according to an example embodiment.

FIG. 3 is a flowchart illustrating a computer implemented method 300 of determining blocks for which an individual Citizen is a committee member. The committee for each block is chosen on the basis of a VRF (Verifiable Random Function), but with a key modification. In some prior blockchains, each participant checks in each round whether it is chosen in the committee. A Citizen with a mobile phone cannot afford to do such frequent checks because waking up the phone every round to do such computation would cause significant battery-drain. Therefore, instead of a random seed, split trust blockchain uses the actual block number to compute the VRF, which means a Citizen can precompute in advance for the next several blocks and can safely sleep until that block number. Note that this information is known only to the concerned Citizen; other Citizens or Politicians cannot guess who will be in the committee for the next block. Also, since an adversary is assumed slow enough not to change the corrupt set of Citizens for the duration of a block commit, it is safe for a Citizen to use the same VRF for that duration.

Method 300 begins with a Citizen computing a VRF by signing the block number N with the private key of the Citizen at operation 310 and then hashing the signed block number N at operation 320. The bits of the hashed signature constitute the VRF. At operation 330, if the hash has the last k bits set to zero, the Citizen is part of the committee for block N (hence a Citizen is part of a committee with probability $2^{-k}$ with k appropriately selected). Any other entity can verify that a Citizen is part of the committee, by simply performing signature validation with the public key of the Citizen and hash verification. Note that the signature function used for generating VRF guarantees a unique signature for a given<message, privatekey>as done in prior blockchains. Operations 310, 320, and 330 are performed several times at least until a block number N+M is determined.

A time at which a particular citizen will be on a consensus committee for processing block number N+M is calculated at operation 340 based on knowledge of the current value of N which may be obtained as described below. In some embodiments, the time between processing blocks, t, may be fixed, and in other embodiment, the time may be estimated or extrapolated based on times between processing recent successive blocks. At operation 350, the Citizen will keep track of time and wake upon reaching the calculated increment of time, M×t, at which it is a committee member for block N+M. Note that M may be zero, meaning that the Citizen will remain awake to participate for block N, or may be a fairly large number, such as 100 or more to ensure battery consumption is not monopolized for each Citizen.

A Citizen in the committee is able to find out reliably what the latest committed block in the blockchain is. To do this, the Citizen queries a random safe sample of Politicians for the latest block number. The Citizen picks the highest number reported by any Politician and asks for proof in the form of signatures of Citizens in the committee of that particular block and their corresponding VRFs. Thus, even if one Politician in the safe sample was honest, the Citizen will know the latest block hash. A Politician cannot advertise an artificially high block number because it won't be able to furnish corresponding signatures and VRFs by Citizens.

Transaction originators submit signed transactions to a safe sample or to all the Politicians. This happens continuously in the background. The transactions can modify multiple keys that the originator has access to. Each transaction in one embodiment accesses two keys (debits one key and credits another). In further embodiments, transactions may access several keys. Politicians gossip these transactions among each other. Transactions outstanding from the same originator can depend on each other. Ordering due to such dependencies is preserved by tracking a per-originator nonce as part of global state. The nonce is monotonically increasing and also helps prevent replay attacks by malicious Politicians. Thus, including the nonce, three global state keys are referenced in a transaction.

Figure 4A:
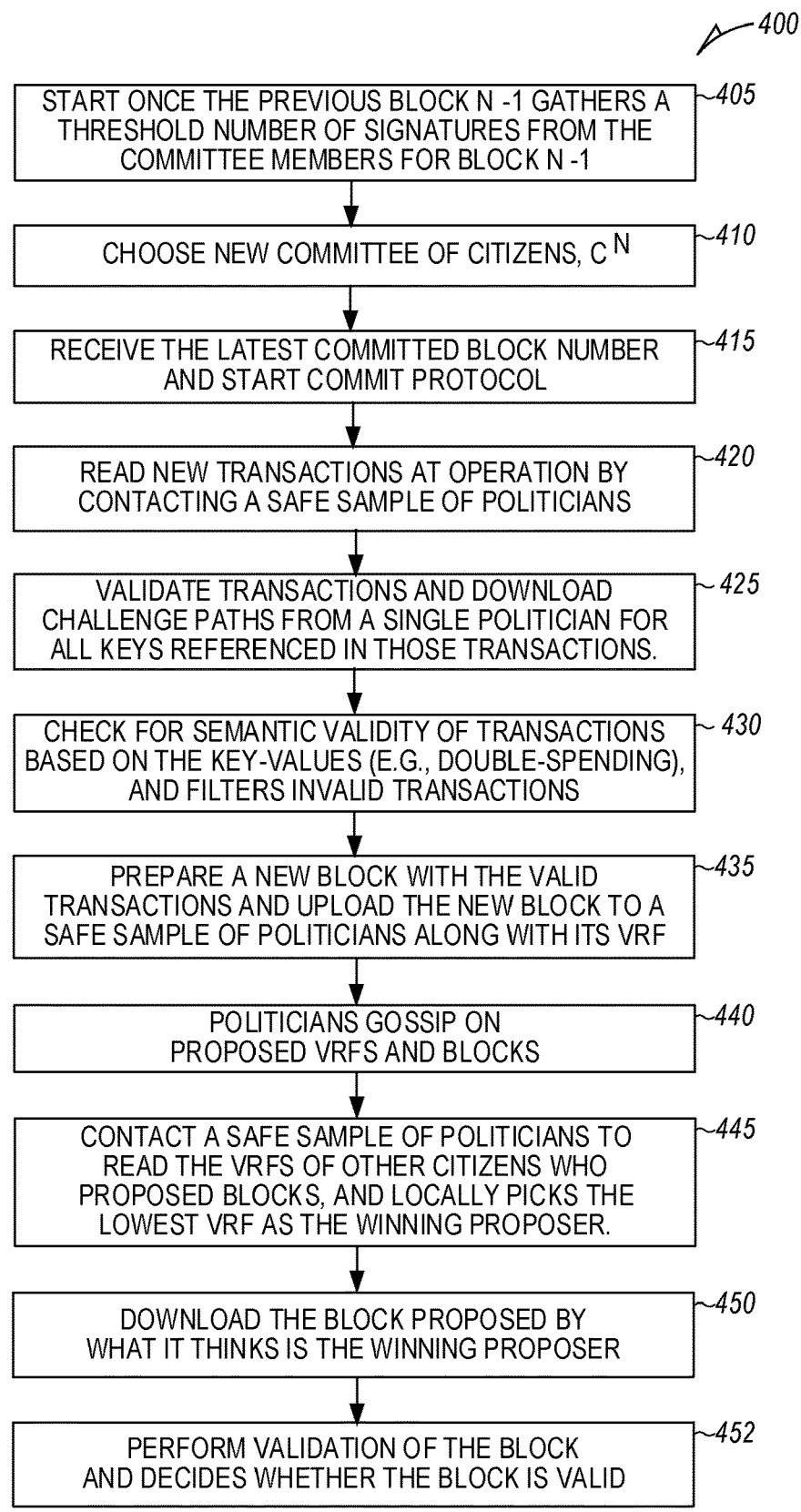
FIGS. 4A and 4B are a flowchart illustrating a method of adding a new block N to a split trust blockchain according to an example embodiment.
Figure 4B:
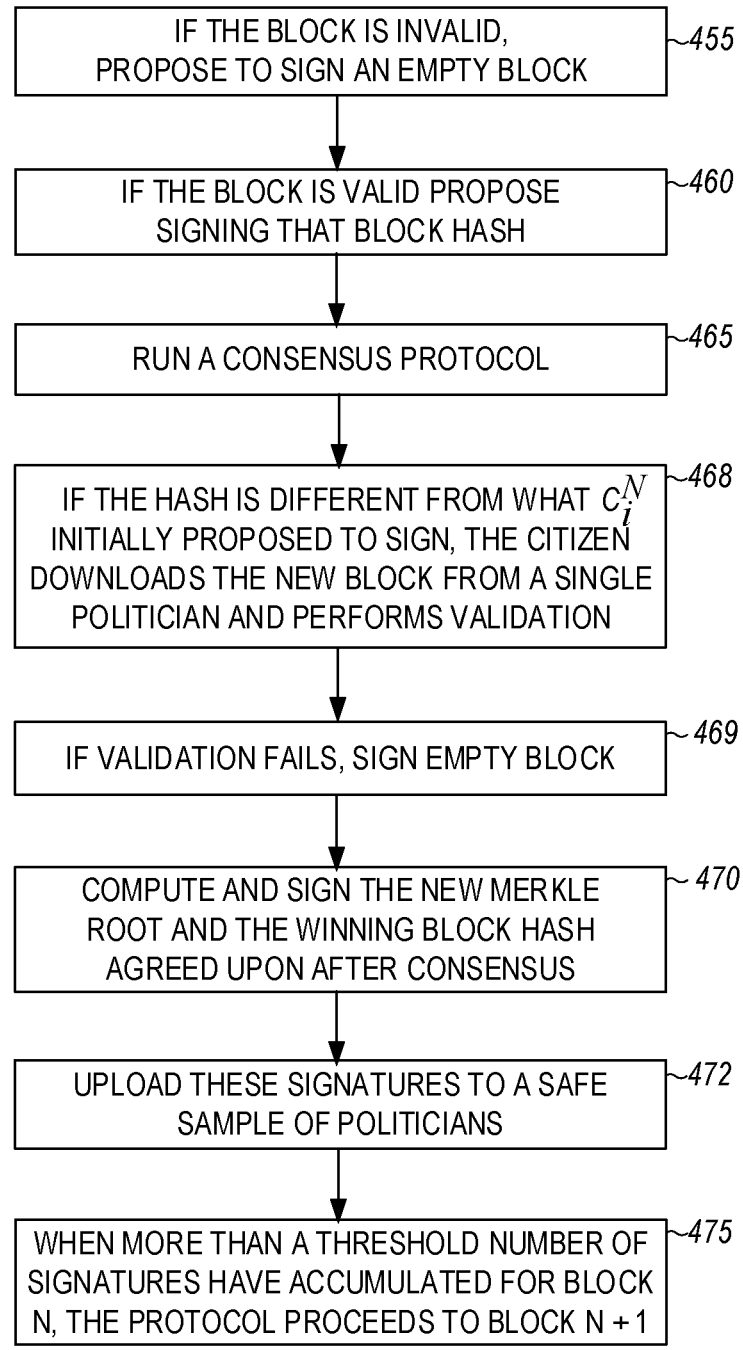

FIGS. 4A and 4B are a flowchart illustrating a method 400 of adding a new block N to a split trust blockchain. Method 400 is performed by a combination of Citizens and Politicians. One of the main operations in a blockchain is adding a new block to the blockchain. The method for block N starts at 405 once the previous block N−1 gathers a threshold number of signatures from the committee members for block N−1. A new committee of Citizens, $C^N$, is chosen for block N at operation 410. The Citizens in $C^N$ get the latest committed block number at operation 415 and starts the commit protocol once that number is N−1. Each Citizen $C_i^N$ in $C^N$ reads new transactions at operation 420 by contacting a safe sample of Politicians. At operation 425 each Citizen $C_i^N$ performs validation on transactions and downloads challenge paths from a single Politician for all keys referenced in those transactions. Citizen $C_i^N$ then checks for semantic validity of transactions based on the key-values (e.g., double-spending), and filters invalid transactions at operation 430.

Citizen $C_i^N$ prepares a new block with the valid transactions and "proposes" the block at operation 435 by uploading the new block to a safe sample of Politicians along with its VRF which proves eligibility. Politicians gossip on proposed VRFs and blocks at operation 440. By contacting a safe sample of politicians at operation 445, each Citizen $C_i^N$ reads the VRFs of all other Citizens in $C^N$ who proposed blocks, and locally picks the lowest VRF as the winning proposer.

At operation 450, each Citizen $C_i^N$ downloads the block proposed by (what it thinks is) the winning proposer, performs validation of the block as above and decides whether the block is valid at operation 452. If the block is invalid, Citizen $C_i^N$ proposes to sign an empty block at operation 455. If the block is valid, Citizen $C_i^N$ proposes signing that block hash at operation 460. Citizens in $C^N$ run a consensus protocol at operation 465 (with all communication happening through Politicians), where each $C_i^N$ proposes either empty block or what it thinks is a valid winning hash. The same BA algorithm as used in AlgoRand may be used for consensus. At the end, all honest Citizens will either agree on empty block, or on a single hash. If the hash is different from what $C_i^N$ initially proposed to sign, the Citizen downloads the new block from a single Politician and performs validation at operation 468. If validation fails, it signs empty block at operation 469.

Each Citizen $C_i^N$ computes the new Merkle root of the global state based on the updated values, signs the new Merkle root, and also signs the winning block hash agreed upon after consensus at operation 470. The Citizen then uploads these signatures to a safe sample of Politicians at operation 472. When more than a threshold number of signatures have accumulated for block N, the protocol proceeds to block N+1 at operation 475.

The BA algorithm may be used for string consensus which calls upon the bit consensus algorithm BBA in a black-box manner. These are the same consensus algorithms used by some prior blockchains. Citizens enter the consensus protocol with a hash of, what they think is the winning block, as input. It is useful to distinguish two scenarios from a consensus viewpoint. If the Citizen winning the proposal (i.e., the one with the lowest VRF) was honest, which would happen two-thirds of the time, all honest Citizens in the committee would enter consensus with the same winning hash, and the protocol will terminate in 5 rounds. However, if the Citizen with the winning VRF was malicious, the Citizen can collude with malicious Politicians to partition the view of honest Citizens. In this case, the consensus protocol would take an expected 11 rounds of communication. If the maximum number (i.e. one-third) of citizens are malicious, the blockchain would incur 7 rounds on average.The number of Citizens in the committee is chosen to balance efficiency and security. A small committee is great for efficiency but given the mechanism for selecting committee members through random VRFs, Chernoff analysis indicates there will be a range in the number of committee members chosen. For instance, with a target committee size of 2000, the actual number of committee members who qualify based on the VRF condition may vary between for example 1700 and 2300. Consequently, the static threshold of signatures may be calibrated such that when the effective committee size is larger (say 2300) for a block, the number of malicious Citizens cannot exceed that threshold. Further, because the threshold is calibrated to be safe at the higher end of the committee-size range, the lower-end of the range should accumulate enough support from honest Citizens. As a result, there is a tradeoff between the committee size, and the fraction of honest Citizens required. For a committee size of 2000, the fraction of honest Citizens selected in one embodiment is 80% of the actual number of committee members for the block.

An optimized version of the block commit protocol provides the same security guarantees as the basic protocol. Three new techniques are described that split trust blockchain may use to speed up the most resource-intensive steps in the basic protocol.

To place the optimizations in context, example current system parameters to be used for split trust blockchain are first described. Future example system parameters are expected to increase yet systems will still benefit from the methods and algorithms described herein. Citizens in split trust blockchain may be run on a smartphone, so it is assumed that their network bandwidth is fairly low, e.g., 1 MB/s. A block size of 2 MB is selected for example, which is comprised of about 20k transactions (each of which is roughly 100 bytes including a 64-byte signature). Each transaction touches an average of 3 keys, one of which is the nonce of the originator. Politician nodes run powerful servers, and a network bandwidth of 40 MB/s between Politicians may be assumed given current network technology. This is representative of typical bandwidth seen across machines in the cloud, e.g., between an Azure VM and a VM from Google Cloud across east-US and west-US. The number of Politicians can be about 200 in this example with a committee size of 2000 Citizens; as the work done per block is purely a function of the committee size, the system can scale to a very large number of Citizens (in the millions). These example parameters equate to Citizens being members of committees every 500 blocks/10 million transactions for just 1 million Citizens and even less often for more Citizens.

The upload of the proposed block by a Citizen is done to a safe sample of at least 15 Politicians. Over the 1 MB/s mobile network, this step alone takes about 30 sec for a 2 MB block. To optimize this step, a pre-declared commitment may be used. The transaction selection process is made deterministic, so that any Citizen can reconstruct what the original proposing Citizen would have done, without the proposing Citizen explicitly uploading the full block to Politicians. Determinism is challenging, however, because the 80% malicious Politicians can send different transactions to different Citizens. Pre-declared commitments are designed to address this.

Figure 5:
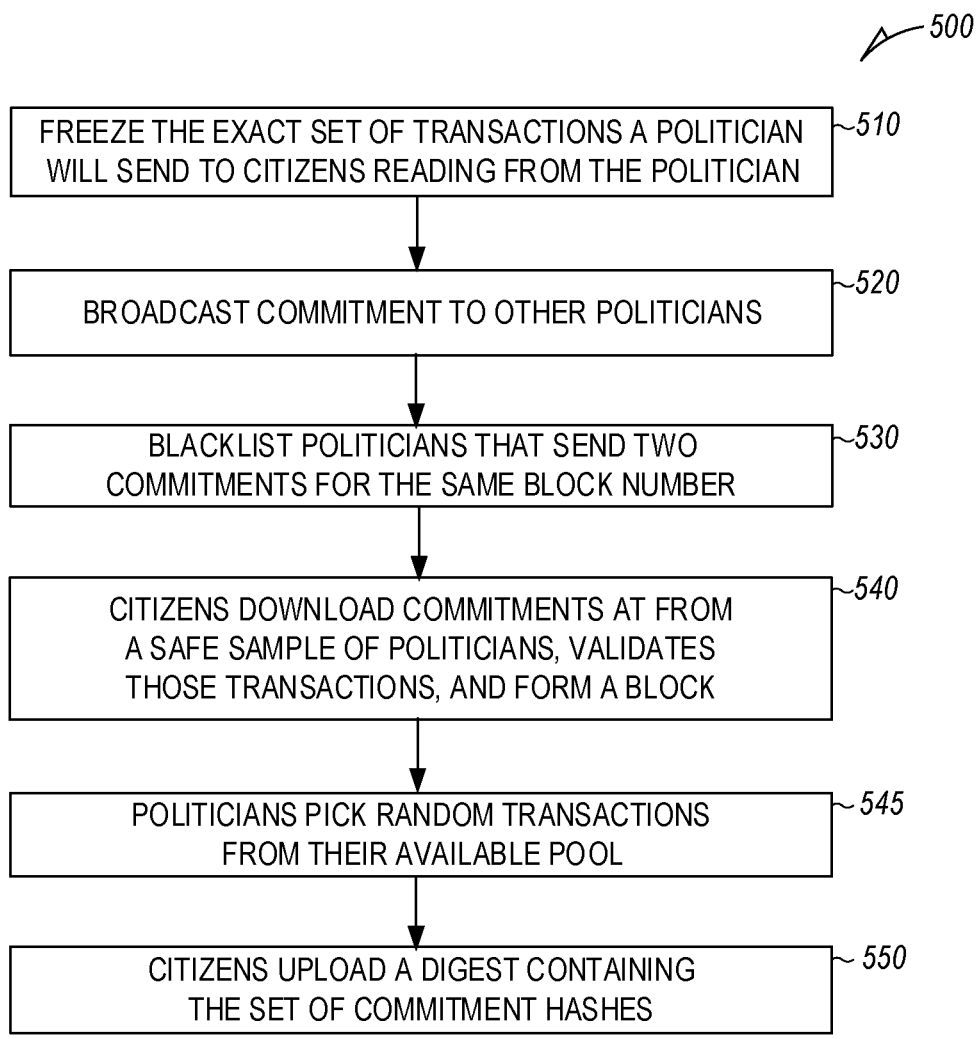
FIG. 5 is a flowchart illustrating a method of proposing blocks using predeclared commitments according to an example embodiment.

FIG. 5 is a flowchart illustrating a method 500 of proposing blocks using predeclared commitments. Different portions of method 500 may be performed by Citizens and Politicians. At the start of block N, each Politician freezes at operation 510 the exact set of transactions a Politician will send to Citizens reading from the Politician. The Politician does so by creating a commitment, which includes a set of (about 2000) transactions, a hash of the transaction set, and then signs the commitment hash along with the block number N. Each Politician then broadcasts its commitment to other Politicians at operation 520. While malicious Politicians may not perform proper gossip, they are forced to issue only one commitment for a given block N. If Citizens or honest Politicians observe two signed commitments from the same Politician for the same block number, that is a clear proof of malicious behavior, and the Politician can be blacklisted at operation 530. Thus, the ability of a Politician to send different transactions to different Citizens is deprived. The only tool a Politician has is to not respond to a subset of Citizens.

A Citizen downloads commitments at operation 540 from a safe sample of Politicians, validates those transactions, and forms a block as before. To reduce overlap of transactions across commitments from multiple Politicians (which would reduce the unique transactions in the final block), each Politicians picks random transactions from their available pool at operation 545. However, the Citizen no longer needs to perform the expensive upload of the full block during the proposal phase. Instead, only a digest at operation 550 containing the set of commitment hashes is uploaded (along with the identity index of the concerned Politicians). Any other Citizen who gets this digest can reconstruct the exact block that the proposing Citizen computed, by downloading the same full commitments from Politicians. This implicit gossip of the proposed block greatly enhances the throughput of split trust blockchain.

However, malicious Politicians can thwart implicit gossip, by refusing to respond to other Citizens, when queried for a commitment. As malicious Politicians need not gossip with honest Politicians, it is possible that some commitments will be under the sole control of the malicious Politicians, who can then squash it for a subset of (or for most) Citizens. To prevent such squashing another level of determinism is introduced. The exact set of Politicians from whom to pull transactions for a given block is limited (randomly chosen based on a hash of the block number). For example, 45 random Politicians may be selected (out of 200) for each block. Instead of reading commitments from 15 Politicians, a Citizen now reads from 30 out of the 45 designated Politicians, thus performing 2x work at this step. At 2000 transactions per commitment, this is about 60 k transactions, or about 6 MB of data. The Citizen then uploads, to a safe sample of Politicians, a witness list containing the list of commitments it was able to successfully download. The witness list of all Citizens gets gossiped between Politicians. The proposing Citizen reads the witness list of all other Citizens, and picks a maximum of 15 commitments, but only from commitments that at least a threshold number of Citizens were able to successfully download. This threshold is fixed to be t+δ where t is the maximum number of malicious nodes in the committee (2300/3=766), and δ is chosen to be 100. Intuitively, all commitments that pass this condition are available with at least δ honest Citizens. As 20% of Politicians are honest, at least 9 out of the 45 commitments will pass this test.

Another step to the protocol includes each Citizen re-uploading k random commitments from the perceived winning block, to n random Politicians. The goal of this re-upload is to ensure with high probability that commitments from malicious Politicians that make it to the final block, also reach all honest Politicians, so that other honest Citizens can download that commitment. This deprives the ability of the malicious Politicians to collude and withhold some commitments from a subset of Citizens. A similar re-upload also is done after consensus completes, on the winning block.

The gossip among politicians should provide that if one honest Politician has a message, all honest Politicians receive the message. Because of the high fraction of dishonesty among Politicians, standard multi-hop gossip with a small number of neighbors doesn't work. For example, if each Politician sends to just 10 neighbors out of 200, there is a high probability that all 10 neighbors were dishonest and drop the message. Therefore, the safe thing to do is that each Politician broadcasts the message to all other Politicians. In the phase where the Politicians need to gossip commitments that were re-uploaded by Citizens in the committee, in the worst case, each Politician may have 15 commitments to gossip, which with full broadcast, results in sending 0.2 MB*15*200=600MB which would take 15 seconds in the critical path, to complete. This gossip of re-uploaded commitments happens twice in the protocol, one before, and one after consensus, so it causes an extra latency of about 30 seconds per block.

To reduce the extra latency, the fact that the messages being gossiped by the different Politicians has a high overlap among them may be leveraged. For example, the same 15 commitments get gossiped by all Politicians because each of the 2000 Citizens would have picked a random sample of Politicians to upload a subset of the 15 commitments. A simple strategy that doesn't work is that each Politician could ask each neighbor whether the neighbor has already received a commitment and send a commitment only if the Politician hasn't received it. Because 80% are malicious, neighbor Politicians would always lie that they haven't received it, to cause a higher load/latency on the system. Instead, split trust blockchain uses a technique called forced-truth gossip that forces malicious Politicians to speak the truth.

Figure 6:
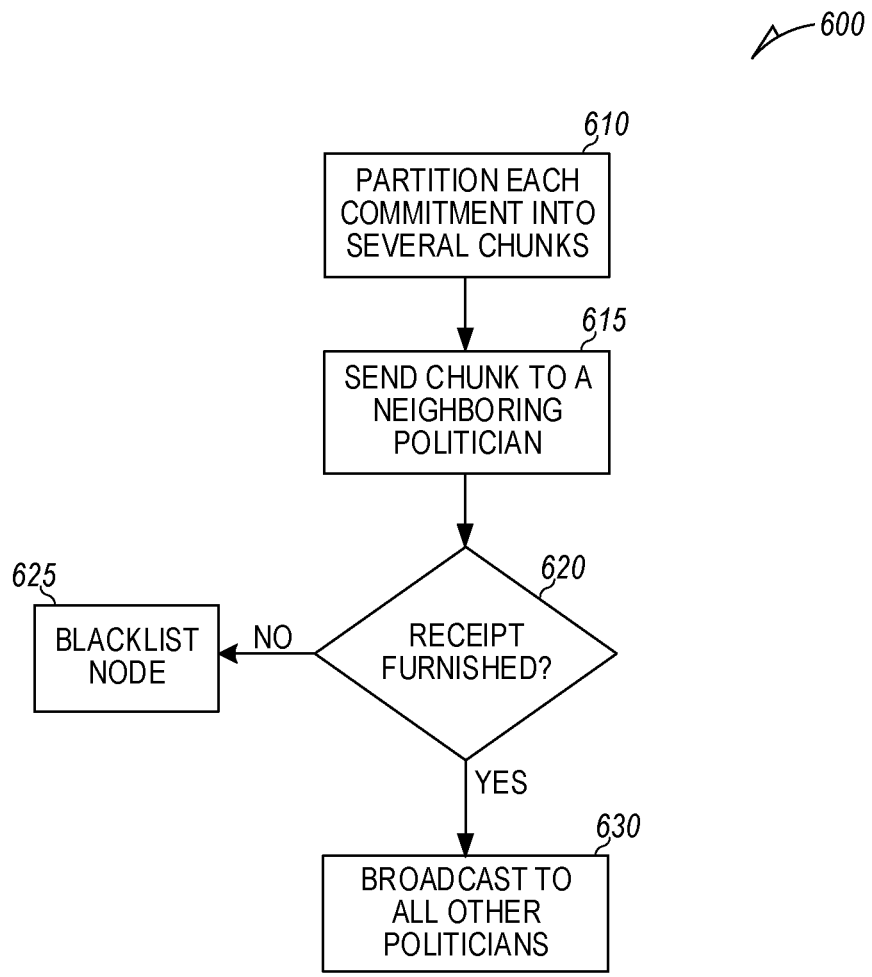
FIG. 6 is a flowchart illustrating a method of forced-truth gossip for execution by high resource devices (Politicians) according to an example embodiment.

FIG. 6 is a flowchart illustrating a method 600 of forced-truth gossip for execution by Politicians. Specifically, each commitment is partitioned into several chunks at operation 610, which is the granularity of gossip. When a chunk is sent to a neighboring Politician as indicated at operation 615, the recipient is expected to send a signed receipt for having received the chunk. If the recipient does not furnish a receipt, as indicated at operation 620, the sending node concludes that the recipient is malicious, and will not send any more chunks to it as indicated at operation 625 where the recipient is listed as malicious in a malicious node data structure that is stored by the Participant.

Note that this is a local inference of malicious behavior; other nodes will still view that Politician as honest. If a receipt is furnished as indicated at operation 620, that receipt is broadcast by the sender at operation 630 to all other Politicians, so that they know not to re-send the corresponding chunk to that recipient. Thus, a malicious Politician either sends a receipt and receives the chunk just once or gets blacklisted by one other Politician. To reduce the chances of race conditions where multiple Politicians send the same chunk to a single recipient simultaneously, the order of chunks may be randomly permuted in each Politician. With this approach, the average load on a single Politician reduces significantly by nearly a factor of 100, as there is high overlap in content to be gossiped across Politicians.

Another expensive part of the basic protocol is the Merkle tree validation. As each challenge path in a 1-billion node Merkle-tree is 30-levels deep, each challenge path would be 300 bytes (10-byte hash.) Downloading 60k challenge paths would cause 18 MB (roughly 18 sec latency) of data download. Besides, the compute work done by the Citizen is also high (1.8 million hash computations). Even worse, this whole process has to be done twice (in two steps). To reduce this cost, a part of this work is offloaded to Politicians in a verifiable manner.

Figure 7:
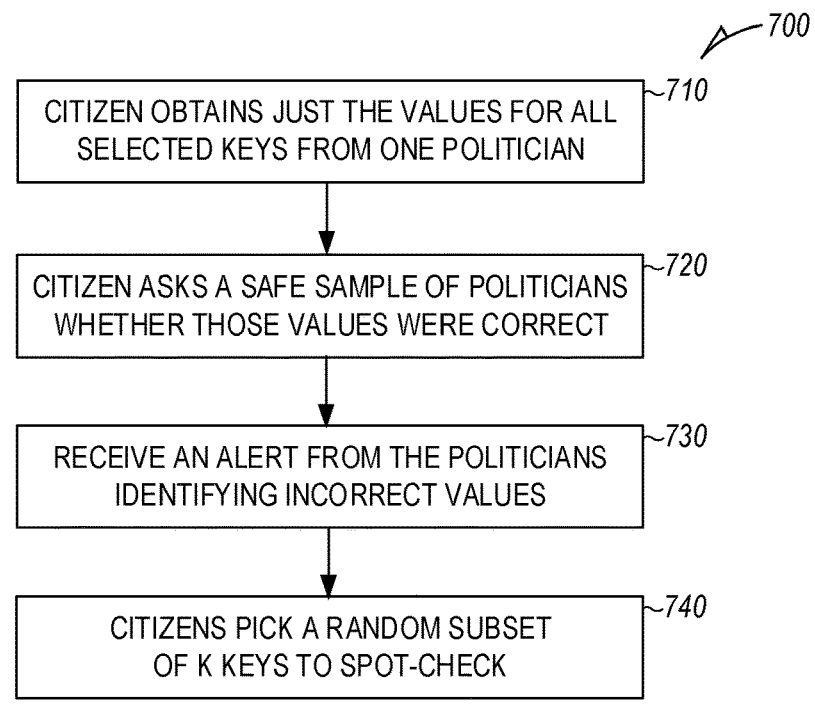
FIG. 7 is a flowchart illustrating a method of offloading Merkle tree validation from Citizens to Politicians according to an example embodiment.

FIG. 7 is a flowchart illustrating a method 700 of offloading Merkle tree validation from Citizens to Politicians. At operation 710, a Citizen obtains just the values for all 60 k keys (no challenge path, so just 0.5 MB instead of 18 MB) from one Politician. At operation 720, the Citizen asks a safe sample of Politicians whether those values were correct. As at least one of the politicians in the safe sample would be honest, the Citizen, at operation 730, receives an alert from the Politicians identifying incorrect values through an exception list. The only way a Politician can provide an incorrect value is by providing a challenge path from the signed Merkle root that indicates a different value for the key. If a lot of the values were wrong, the exception list would be quite large and eat into the savings. To avoid this, at operation 740, Citizens pick a random subset of k keys to spot-check. If k is sufficiently large, a Politician can lie only in a small number of keys and still pass the spot-check. Thus, the extra spot-check bounds the size of the exception-list. In order to ask a safe sample of Politicians whether the values are correct, the Citizen uploads a deterministically ordered key-list to the 15 Politicians (60 k×4×15=3.6 MB). Such upload may be done once. Values are bucketized in groups of 100 values, allowing the Citizen to upload only bucket-level hashes for validation. When a Politician notices a mismatch for a bucket, it sends the bucket index, and the Citizen gets the correct values for all keys in that bucket, and then get challenge paths for keys that disagree. Because of the spot-checks, only a small number of buckets can mismatch.

Updating the Merkle tree is a trickier problem, because the Citizen cannot reconstruct the new Merkle root T' without challenge paths for all modified keys. Instead, the Politicians will compute the updated Merkle tree T'. Naturally, they cannot be trusted to do this computation correctly. As a result, a protocol is used to enable Citizens to verify the correctness of the updated Merkle tree without downloading all challenge paths.

To enable Citizens to verify the correctness of the updated Merkle tree, let the original tree be T and the updated tree be T'. Break T' at a level, say a, that has $2^a$ nodes. This level is referred to as the frontier level and the nodes at this level as frontier nodes. Citizens obtain the values of the frontier nodes of T' from a random subset of the Politicians. The Citizens then run a spot-checking algorithm by picking a random subset of frontier nodes and asking a Politician to prove the correctness of that frontier node. The Politician does this by showing the challenge paths (up to the frontier node) in T' for all leaves that have changed and the challenge paths in T for all (potentially internal) nodes that have not changed. Next, Citizens create exception lists with the help of a random subset of Politicians. This list denotes which frontier nodes are incorrect with the Citizens. The Citizens then proceed to sequentially correct the incorrect frontier nodes and then finally compute the correct root of T' from the frontier nodes. The sizes of exception lists can be bounded, and Citizens do not accept an incorrectly updated Merkle tree T', except with a small probability, which can be factored into the set of malicious Citizens.

Figure 8:
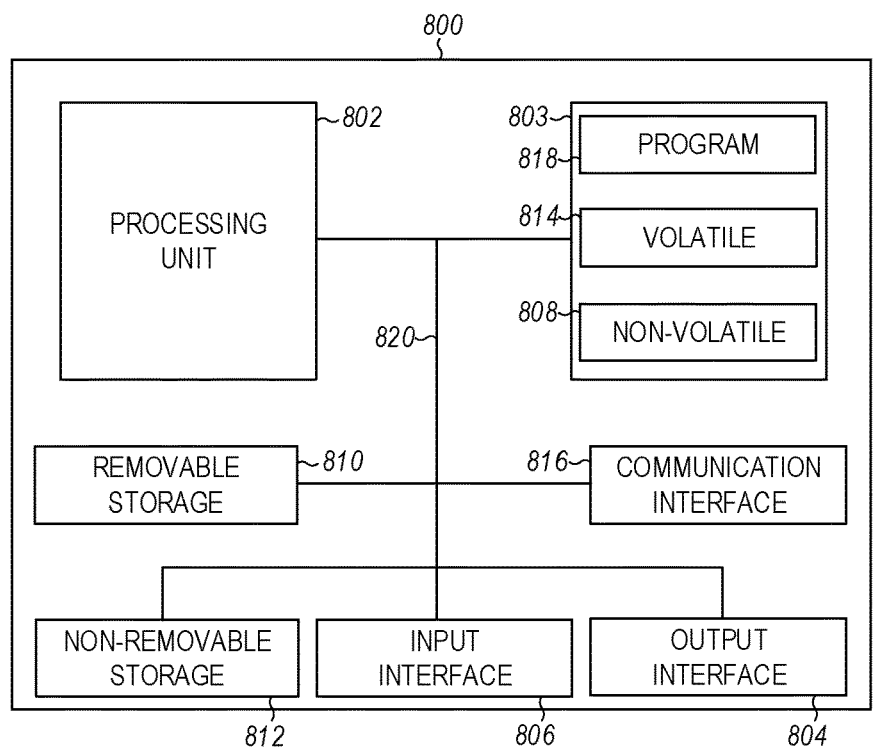
FIG. 8 is a block schematic diagram of a computer system to implement one or more example embodiments.

FIG. 8 is a block schematic diagram of a computer system 800 for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods and systems described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 818 along with the workspace manager 822 may be used to cause processing unit 802 to perform one or more methods or algorithms described herein.

EXAMPLES

1. A first resource constrained computing device is configured to perform operations including receiving transactions to be added to an encrypted block chain ledger from a sample of untrusted high resource devices, preparing proposed block of the received transactions, provide the proposed block to the sample of untrusted high resource devices, receiving proposed blocks from the untrusted high resource devices originating from a set of resource constrained computing devices, and running a consensus protocol to select one proposed block to add to the encrypted block chain ledger stored on the untrusted high resource devices.

2. The system of example 1 wherein the set of resource constrained computing devices validate the transactions before adding transactions to the proposed block, wherein computationally intensive processing is verifiably offloaded to the untrusted high resource devices, and wherein up to 80% of the untrusted high resource devices are malicious.

3. The system of any of examples 1-2 wherein each resource constrained computing device in the set computes a new Merkle root of a global state of the encrypted block chain ledger, signs the new Merkle root, signs a consensus block hash, and uploads signatures to a safe sample of untrusted high resource devices that store the entire Merkle tree.

4. The system of example 3 and further comprising performing random spot checks of a subset of keys in the Merkle tree stored by untrusted high resource devices.

5. The system of example 4 wherein the random spot checks indirectly constrain malicious high resource devices to limit incorrect responses to the random spot checks to a fraction of the number of key-value pairs.

6. The system of any of examples 4-5 and further comprising using an exception list uploaded by other low resource devices to efficiently detect incorrect responses from untrusted high resource devices.

7. The method of any of examples 3-6 and further including receiving an updated Merkle tree that was updated by a high resource device, breaking the updated Merkle tree at a frontier level wherein the nodes at the frontier level are designated frontier nodes, obtaining values of the frontier nodes from a random subset of untrusted high resource nodes, requesting an untrusted high resource device to prove the correctness of the obtained value of a selected frontier node, and creating an exception list denoting untrusted high resource devices reporting incorrect frontier nodes and from which not to receive updated Merkle trees.

8. The system of any of examples 1-7 and further including requesting a signed receipt for data sent to an untrusted high resource device, and locally inferring that the untrusted high resource device is malicious in response to no signed receipt being received.

9. The system of example 8 and further comprising broadcasting receipts received to other untrusted resource devices to prevent duplicate gossip by high resource devices.

10. The system of any of examples 1-9 wherein the set of resource constrained computing devices comprise mobile computing devices.

11. The system of any of examples 1-10 wherein the first resource constrained computing device is aware of times the first resource constrained computing device needs to be awake to run the consensus protocol.

12. The system of example 11 wherein the first resource constrained computing device calculates the time it needs to be awake based on a known random number generator seed.

13. The system of example 12 and wherein the first resource constrained computing device is further configured to obtain a current block number as the seed, sign the block number with a private key to form a signature, hash the signature to form a verifiable random number, and determine that the first resource constrained computing device is part of the set for the block number in response to the verifiable random number.

14. The system of example 13 wherein the first resource constrained computing device is part of the set in response to a selected number of the last bits of the verifiable random number being zero.

15. The system of any of examples 13-14 wherein a verifiable random number is generated for a sequence of next block numbers until a block number is identified for which the first resource constrained computing device is a member of the set.

16. The system of any of examples 1-15 wherein the consensus protocol includes using the high resource devices to perform gossip.

17. A machine-readable storage device has instructions for execution by a processor of a machine to cause the processor of a resource constrained computing device to perform operations to perform a method. The operations include receiving transactions to be added to an encrypted block chain ledger from a sample of untrusted high resource devices, preparing a proposed block of the received transactions, providing the proposed block to the sample of untrusted high resource devices, receiving proposed blocks from the untrusted high resource devices originating from a set that includes other resource constrained computing devices, and running a consensus protocol to select one proposed block to add to the encrypted block chain ledger stored on the untrusted high resource devices.

18. The device of example 17 wherein the set of resource constrained computing devices validate the transactions before adding transactions to the proposed block, wherein computationally intensive processing is verifiably offloaded to the untrusted high resource devices, and wherein up to 80% of the untrusted high resource devices are malicious.

19. The device of any of examples 17-18 wherein each resource constrained computing device in the set computes a new Merkle root of a global state of the encrypted block chain ledger, signs the new Merkle root, signs a consensus block hash, and uploads signatures to a safe sample of untrusted high resource devices that store the entire Merkle tree and wherein the operations further include obtaining a current block number, signing the block number with a private key to form a signature, hashing the signature to form a verifiable random number, and determining if the resource constrained computing device is part of the set of resource constrained computing devices for the block number in response to the verifiable random number.

20. A device includes a processor and a memory device coupled to the processor and having a program stored thereon for execution by the processor to perform operations. The operations include receiving transactions to be added to an encrypted block chain ledger from a sample of untrusted high resource devices, preparing a proposed block of the received transactions, providing the proposed block to the sample of untrusted high resource devices, receiving proposed blocks from the untrusted high resource devices originating from a set of resource constrained computing devices, and running a consensus protocol to select one proposed block to add to the encrypted block chain ledger stored on the untrusted high resource devices.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A first resource constrained computing device having a storage device with instructions and a processor to execute the instructions to perform operations comprising:
   receiving transactions to be added to an encrypted block chain ledger from a sample of untrusted high resource devices;
   preparing a proposed block of the received transactions;
   providing the proposed block to the sample of untrusted high resource devices;
   receiving proposed blocks from the untrusted high resource devices originating from a set of resource constrained computing devices; and
   running a consensus protocol by using a safe sample of high resource devices to perform gossip in order to select one proposed block to add to the encrypted block chain ledger stored on the untrusted high resource devices.

2. The device of claim 1 wherein the set of resource constrained computing devices validate the transactions before adding transactions to the proposed block, wherein computationally intensive processing is verifiably offloaded to the untrusted high resource devices, and wherein up to 80% of the untrusted high resource devices are malicious.

3. The device of claim 1 wherein each resource constrained computing device in the set computes a new Merkle root of a global state of the encrypted block chain ledger, signs the new Merkle root, signs a consensus block hash, and uploads signatures to a safe sample of untrusted high resource devices that store the entire Merkle tree.

4. The device of claim 3 wherein the operations further comprise performing random spot checks of a subset of keys in the Merkle tree stored by untrusted high resource devices.

5. The device of claim 4 wherein the random spot checks indirectly constrain malicious high resource devices to limit incorrect responses to the random spot checks to a fraction of the number of key-value pairs.

6. The device of claim 4 wherein the operations further comprise using an exception list uploaded by other low resource devices to efficiently detect incorrect responses from untrusted high resource devices.

7. The device of claim 3 wherein the operations further comprise:
  receiving an updated Merkle tree that was updated by a high resource device;
  breaking the updated Merkle tree at a frontier level wherein the nodes at the frontier level are designated frontier nodes;
  obtaining values of the frontier nodes from a random subset of untrusted high resource nodes;
  requesting an untrusted high resource device to prove the correctness of the obtained value of a selected frontier node; and
  creating an exception list denoting untrusted high resource devices reporting incorrect frontier nodes and from which not to receive updated Merkle trees.

8. The device of claim 1 wherein the operations further comprise:
  requesting a signed receipt for data sent to an untrusted high resource device; and
  locally inferring that the untrusted high resource device is malicious in response to no signed receipt being received.

9. The device of claim 8 wherein the operations further comprise broadcasting receipts received to other untrusted resource devices to prevent duplicate gossip by high resource devices.

10. The device of claim 1 wherein the set of resource constrained computing devices comprise mobile computing devices.

11. A first resource constrained computing device having a storage device with instructions and a processor to execute the instructions to perform operations comprising:
  receiving transactions to be added to an encrypted block chain ledger from a sample of untrusted high resource devices;
  preparing a proposed block of the received transactions;
  providing the proposed block to the sample of untrusted high resource devices;
  receiving proposed blocks from the untrusted high resource devices originating from a set of resource constrained computing devices; and
  running a consensus protocol to select one proposed block to add to the encrypted block chain ledger stored on the untrusted high resource devices, wherein the first resource constrained computing device is aware of times the first resource constrained computing device needs to be awake to run the consensus protocol.

12. The device of claim 11 wherein the first resource constrained computing device calculates the time it needs to be awake based on a known random number generator seed.

13. The device of claim 12 wherein the operations further comprise:
  obtaining a current block number as the seed;
  signing the block number with a private key to form a signature;
  hashing the signature to foi in a verifiable random number; and
  determining that the first resource constrained computing device is part of the set for the block number in response to the verifiable random number.

14. The device of claim 13 wherein the first resource constrained computing device is part of the set in response to a selected number of the last bits of the verifiable random number being zero.

15. The device of claim 13 wherein a verifiable random number is generated for a sequence of next block numbers until a block number is identified for which the first resource constrained computing device is a member of the set.

16. The device of claim 1 wherein the consensus protocol includes using the high resource devices to perform gossip.

17. A machine-readable storage device having instructions for execution by a processor of a machine to cause the processor of a resource constrained computing device to perform operations to perform a method, the operations comprising:
  receiving transactions to be added to an encrypted block chain ledger from a sample of untrusted high resource devices;
  preparing a proposed block of the received transactions;
  providing the proposed block to the sample of untrusted high resource devices;
  receiving proposed blocks from the untrusted high resource devices originating from a set that includes other resource constrained computing devices; and
  running a consensus protocol by using a safe sample of high resource devices to perform gossip in order to select one proposed block to add to the encrypted block chain ledger stored on the untrusted high resource devices.

18. The device of claim 17 wherein the set of resource constrained computing devices validate the transactions before adding transactions to the proposed block, wherein computationally intensive processing is verifiably offloaded to the untrusted high resource devices, and wherein up to 80% of the untrusted high resource devices are malicious.

19. The device of claim 17 wherein each resource constrained computing device in the set computes a new Merkle root of a global state of the encrypted block chain ledger, signs the new Merkle root, signs a consensus block hash, and uploads signatures to a safe sample of untrusted high resource devices that store the entire Merkle tree and wherein the operations further comprise:
  obtaining a current block number;
  signing the block number with a private key to form a signature;
  hashing the signature to form a verifiable random number; and
  determining if the resource constrained computing device is part of the set of resource constrained computing devices for the block number in response to the verifiable random number.

20. A device comprising:
  a processor; and
  a memory device coupled to the processor and having a program stored thereon for execution by the processor to perform operations comprising:
    receiving transactions to be added to an encrypted block chain ledger from a sample of untrusted high resource devices;
    preparing a proposed block of the received transactions;
    providing the proposed block to the sample of untrusted high resource devices;
    receiving proposed blocks from the untrusted high resource devices originating from a set of resource constrained computing devices; and running a consensus protocol by using a safe sample of high resource devices to perform gossip in order to select one proposed block to add to the encrypted block chain ledger stored on the untrusted high resource devices.

* * * * *